United States Patent Office 2,694,052
Patented Nov. 9, 1954

2,694,052

POLYMERIZATION OF VINYL ACETATE IN EMULSION

Peter J. Canterino, Yonkers, N. Y., assignor to Nopco Chemical Company, Harrison, N. J., a corporation of New Jersey No Drawing. Application May 19, 1950, Serial No. 163,100

15 Claims. (Cl. 260—29.6)

This invention relates to a polymerization of vinyl acetate and more particularly to a process of preparing stable aqueous emulsions of polyvinyl acetate.

The polymerization of vinyl acetate in an emulsified form to give emulsions of polymers is known in the art. Such emulsions are generally stable for a short time after their manufacture but they deteriorate rapidly on storage. In some cases there is a tendency for a gel to form, while in others the coalescence of the particles causes the formation of two layers. In either case the usefulness of such emulsions is determined by the length of time between their preparation and their actual use. It has also been established in the prior art that the stability of emulsions, prepared by substantially identical processes, varies from batch to batch. This is a distinct disadvantage since in such cases it is impossible to determine beforehand the length of time that a particular emulsion can be stored and yet be in satisfactory condition for use when needed.

The polymerization of vinyl acetate is often accompanied by production difficulties, such as prolonged induction periods and excessive foaming and puffing. Foaming and puffing are disadvantageous for if the emulsion tends to foam, it is difficult to control the polymerization and as a result the final emulsion is generally unstable.

The object of this invention is to produce stable aqueous emulsions of polyvinyl acetate.

Another object of the invention is to provide an improved process for producing aqueous emulsions of polyvinyl acetate.

A further object of this invention is to produce an emulsified polyvinyl acetate whose nature is such that clear continuous films having excellent adhesion to glass can be formed from the emulsion of the polymer at or near room temperature.

Other objects of this invention will in part be obvious and will in part appear hereinafter.

These objects are accomplished by polymerizing vinyl acetate in an aqueous emulsion in the presence of a polymerization catalyst, a complex inorganic cyanide compound, an aliphatic mercaptan and a polyvinyl alcohol with a sulfated or sulfonated fatty acid ester as the emulsifying agent.

In the process of the invention, there is used as the emulsifying agent a sulfated or a sulfonated fatty acid ester. In preparing these esters either saturated or unsaturated fatty acids may be employed and such acids may contain keto or hydroxy groups. The fatty acids which are used in making the esters contain from 8 to 18 carbon atoms. Alcohols which are used in making the esters are monohydroxy alcohols containing from 1 to 6 carbon atoms. When the esters used in making the emulsifying agent are prepared from either unsaturated or hydroxy fatty acids, the $SO_3$ group will be present in the emulsifying agent as a sulfate ester group, but when the fatty acid is a saturated non-hydroxy fatty acid the $SO_3$ group will be present in the emulsifying agent as a true sulfonic group. When the fatty acid ester contains the sulfonic group, the ester should not contain more than a total of about 18 carbon atoms in order to give the best results in the process of the invention. It is greatly preferred to employ the esters containing a sulfate group and particularly esters of isopropyl alcohol such as isopropyl oleate in the process of the invention. The sulfonic type esters do, however, give excellent results in the process of the invention as will be apparent from Example III given hereinafter. Among the many esters which can be employed in preparing the emulsifying agents are esters such as methyl oleate, ethyl oleate, isopropyl oleate, isobutyl oleate, amyl oleate, hexyl oleate, methyl ricinoleate, isopropyl ricinoleate, methyl laurate, ethyl laurate, isopropyl laurate, etc. The methods of producing such sulfated and sulfonated esters are well known in the art and therefore will not be described herein. From about 0.1% to about 2.0% of the emulsifying agent calculated on the weight of the vinyl acetate being polymerized is preferably employed in the process of the invention. Both the sulfonated and sulfated type esters are usually employed in the form of salts thereof such as the sodium or potassium salts, and it is in such form that they are employed in the present process. For convenience, however, the esters will be referred to as such in the description of the process and in the claims.

The polymerization catalysts which are employed in the process of the invention are substances which are capable of liberating reactive oxygen under the conditions employed in the polymerization process, e. g., compounds such as hydrogen peroxide and potassium persulfate, sodium persulfate or ammonium persulfate. When hydrogen peroxide is employed, it is preferably used as a 30% aqueous solution thereof and in a concentration between about 0.5% and about 1.5% of such a solution calculated on the weight of the vinyl acetate being polymerized. The hydrogen peroxide can, of course, be used in forms other than 30% aqueous solutions if desired. In such cases, amounts corresponding to those just set forth will be used. When potassium, sodium or ammonium persulfate is used as the polymerization catalyst, it is employed in an amount equal to from about 0.05% to about 0.15% based on the weight of the vinyl acetate being polymerized. When such a persulfate compound is being employed as the catalyst, it is preferred to have present in the emulsion from about 5% to about 15% of ammonia based on the weight of the persulfate compound since it has been found that ammonia apparently has a decidedly beneficial influence on the catalytic effect of such persulfate catalysts when they are employed in the process of the present invention. The ammonia may be added to the emulsion by bubbling ammonia gas into the emulsion or by adding a desired amount of concentrated aqueous ammonia to the emulsion. However, the persulfate catalysts give excellent results in the process of the invention even when there is no ammonia present in the emulsion; therefore, one need not use ammonia in conjunction with the persulfate catalysts in order to obtain very stable emulsions of polyvinyl acetate by the process of the invention.

The polyvinyl alcohol which is used in the process of the invention may be of any desired viscosity. Polyvinyl alcohol is sold commercially in three different viscosity grades, and any one of these three is quite suitable for use in the present process. The amount of polyvinyl alcohol which is employed can vary from about 1% to about 10% of the weight of the vinyl acetate being polymerized. Preferably from about 2% to 6% of polyvinyl alcohol based on the weight of the vinyl acetate is used.

Any primary, secondary or tertiary aliphatic mercaptan can be employed in the process of this invention. It has been established, however, that mercaptans with a molecular weight below that of lauryl mercaptan give the best resutls. It has been found that the amount of mercaptan used will determine to some extent the degree of "toughness" of the film, i. e., as the amount of mercaptan employed is increased, the softer the film formed by the emulsion will be, and vice versa. It has also been found that the mercaptans coact with the polymerization catalyst in some manner or other to beneficially affect the course of the polymerization reaction. It is preferred in the process of the invention to employ from about 0.001% to about 0.9% of an aliphatic mercaptan based on the weight of the vinyl acetate being polymerized. Among the many aliphatic mercaptans which can be employed in the process of the invention are mercaptans such as tertiary butyl mercaptan, n-octyl mercaptan, tertiary octyl mercaptan, tertiary dodecyl mercaptan, tertiary hexadecyl mercaptan, etc. Ordinarily it is preferred to use tertiary octyl mercaptan in the process of the invention since it is one of the least expensive and most readily available of the mercaptans. All of the other mercaptans listed above, however, and other similar aliphatic mercaptans are quite suitable for use in the process of the invention and give the same excellent results as tertiary octyl mercaptan.

The complex inorganic cyanide compound used in the process of the invention can be either sodium ferricyanide, potassium ferricyanide, sodium ferrocyanide or potassium ferrocyanide. The complex cyanide compound need be used in only a very small amount with only from about 0.001% to about 0.005% of the cyanide based on the weight of the vinyl acetate being polymerized being needed. Larger amounts of cyanide compound can be employed if desired but no particularly useful purpose is served by so doing.

The amount of water in which the vinyl acetate is emulsified prior to carrying out the polymerization reaction should be equal to at least about 60% of the weight of the vinyl acetate. If too little water is used the reaction will become rather violent and cannot be easily controlled. Also, the emulsion of the polymerization product will become too thick and agitation of the emulsion during the reaction will be extremely difficult. The maximum amount of water in the emulsion preferably should not exceed about 150% of the weight of the vinyl acetate being polymerized although, if desired, a larger ratio of water to vinyl acetate can be used.

For a fuller understanding of the nature and objects of the invention, reference may be had to the following examples which are given merely as further illustrations of the invention and are not to be construed in a limiting sense.

*Example I*

Three parts of polyvinyl alcohol were dissolved in 30 parts of water. Then 0.2 part of sulfated isopropyl oleate and 0.0015 part of potassium ferrocyanide each dissolved in 5 parts of water were added. Next 60 parts of vinyl acetate containing 0.25 part of tertiary octyl mercaptan was poured into the mixture and an emulsion was then formed by agitating the mixture. Then 0.3 part of 30% hydrogen peroxide dissolved in 5 additional parts of water was added to the emulsion and the agitation continued. The reaction mixture was slowly warmed to 63° C. The reaction then became exothermic and cooling was applied to keep the temperature just below reflux temperature. As the polymerization proceeded, the reflux temperature increased and the temperature of the mass was allowed to rise until the polymerization was complete. When the temperature stopped rising and began to fall, the reaction mixture was cooled to room temperature. An exceedingly stable polyvinyl acetate emulsion was obtained. Only about three hours' time was required for the complete polymerization reaction.

*Example II*

Three parts of polyvinyl alcohol were completely dissolved in 30 parts of water, and then 0.67 part of sulfated isopropyl oleate was added thereto in 5 parts of water. Next 0.001 part of potassium ferrocyanide was added to the mixture with another 5 parts of water, and thereafter 0.01 part of tertiary actyl mercaptan and 0.3 part of capryl alcohol admixed with 60 parts of vinyl acetate were added to the mixture with stirring. Then 0.05 part of potassium persulfate and 0.017 part of 28% ammonium hydroxide dissolved in 5 additional parts of water were admixed with the mixture. The mixture was then heated to a gentle reflux, and the heating continued until the reaction was sufficiently underway to furnish its own heat. At this point sufficient cooling was applied to keep the reaction mixture at a fair rate of reflux and to prevent the reaction from becoming too vigorous. As more and more of the vinyl acetate became polymerized, the reflux temperature of the mixture increased and the temperature of the mass was allowed to rise until the polymerization was complete. The emulsion was then cooled with agitation giving an exceedingly stable polyvinyl acetate emulsion. The polymerization reaction was completed in about four hours.

*Example III*

A solution of 0.55 parts of isopropyl sodium sulfolaurate (i. e. a true sulfonate rather than a sulfate type compound) in 5 parts of water was admixed with a solution of 3 parts of polyvinyl alcohol in 30 parts of water, and then 0.0016 part of potassium ferrocyanide in 5 parts of water was admixed therewith. The resulting mixture was then thoroughly admixed with 60 parts of vinyl acetate and 0.53 part of tertiary octyl mercaptan to give an emulsion. Then 0.63 part of a 30% solution of hydrogen peroxide dissolved in 5 parts of water was admixed with the emulsion and the emulsion then warmed with stirring to reflux temperature. As the polymerization proceeded the temperature of the mass rose slowly to a maximum of 85° C. The reaction was complete in 4 hours. A very stable polyvinyl acetate emulsion was obtained.

*Example IV*

A solution of 0.16 part of sulfated isobutyl oleate in 5.3 parts of water was admixed with a solution of 3 parts of polyvinyl alcohol in 41.3 parts of water. Then 0.0016 part of potassium ferrocyanide in 5 parts of water were admixed therewith. Thereafter 60 parts of vinyl acetate and 0.53 part of tertiary octyl mercaptan were added and the entire mixture emulsified with stirring. Then 0.63 part of a 30% solution of hydrogen peroxide in 5 parts of water was added to the emulsion and the emulsion then warmed to reflux temperature. The temperature rose slowly to 90° C. as the polymerization proceeded. The reaction was completed in four hours. A very excellent, stable emulsion was obtained.

The emulsions of polyvinyl acetate which are prepared by the process of my invention are exceedingly stable and they do not form gels or separate into layers even when stored for many months. This is a very important feature of these emulsions and it greatly increases their utility over the prior art emulsions of polyvinyl acetate, many of which are excedingly unstable. Also, the emulsions obtained by my process are superior to many of the prior art emulsions of polyvinyl acetate since clear continuous films having excellent adhesion to glass may be formed at room temperature from the emulsions produced by my novel process whereas to obtain such films from many of the prior art emulsions it is necessary to employ temperatures as high as 100° C. in forming the film. Not only does my novel process give emulsions which are much superior to the prior art emulsions of polyvinyl acetate but also my process provides a much more satisfactory and more easily controlled procedure for emulsion polymerization of vinyl acetate than the prior polymerization procedures. My novel process almost completely eliminates the prolonged induction period which is inherent in most of the prior art procedures. Another great advantage of my process is that substantially all of the vinyl acetate is converted to polyvinyl acetate, and therefore it is not necessary to treat the emulsions of the polymers to remove unreacted vinyl acetate therefrom as is the case in many instances with emulsions of polyvinyl acetate prepared by prior art processes. Also, the polymerization reaction when carried out by my process proceeds very smoothly and is readily controlled as contrasted to the extremely vigorous and difficult to control reactions of many of the prior art polymerization procedures. The reasons as to why my process gives such exceedingly outstanding results have, as yet, not ben definitely ascertained. Apparently, however, it is the coaction of the mercaptan, the cyanide compound, the polymerization catalyst, the polyvinyl alcohol and the emulsifying agent which can be and are employed in the process of my invention that give my process its outstanding features since if any of these five factors in my process are varied other than as specified hereinabove, the results obtained by such altered process are greatly inferior to the results obtained by my process. That does not mean, however, that no variations other than those specified hereinabove can be made in my process. It may be noted that in Example II a small amount of capryl alcohol was included in the emulsion. The reason that it was included was to diminish the slight tendency of the emulsion to foam during the polymerization. Other similar minor variations may be made in the process as long as the essential features Having described my invention, what I claim as new and desire to secure by Letters Patent is:

1. A process for preparing a stable aqueous emulsion of polyvinyl acetate comprising polymerizing vinyl acetate in an aqueous emulsion in the presence of from about 0.1% to about 2.0% of a fatty acid ester having a carbon chain length of from 9 to 24 carbon atoms and containing an $SO_3$ group, the fatty acid portion of said ester having a carbon chain length of 8 to 18 carbon atoms, a catalyst selected from the class consisting of peroxy and persulfate catalyst, from about 0.001% to about 0.9% of an aliphatic mercaptan, from about 0.001% to about 0.005% of a complex inorganic cyanide compound selected from the class consisting of sodium ferricyanide, potassium ferricyanide, sodium ferrocyanide and potassium ferrocyanide and from about 1.0% to about 10.0% polyvinyl alcohol.

2. The process for preparing a stable aqueous emulsion of vinyl acetate comprising polymerizing vinyl acetate in an aqueous emulsion in the presence of from about 0.1% to about 2.0% of a sulfated ester having a carbon chain length of from 9 to 24 carbon atoms, the fatty acid portion of said ester having a carbon chain length of 8 to 18 carbon atoms, a catalyst selected from the class consisting of peroxy and persulfate catalysts, from about 0.001% to about 0.9% of an aliphatic mercaptan, from about 0.001% to about 0.005% of a complex inorganic cyanide compound selected from the class consisting of sodium ferricyanide, potassium ferricyanide, sodium ferrocyanide and potassium ferrocyanide and from about 1.0% to about 10.0% polyvinyl alcohol.

3. A process for preparing a stable aqueous emulsion of vinyl acetate comprising polymerizing vinyl acetate in an aqueous emulsion in the presence of from about 0.1% to about 2.0% of a sulfated isopropyl ester of a fatty acid having a carbon chain length of from about 8 to 18 carbon atoms, a catalyst selected from the class consisting of peroxy and persulfate catalysts, from about 0.001% to about 0.9% tertiary octyl mercaptan, from about 0.001% to about 0.005% of a complex inorganic cyanide compound selected from the class consisting of sodium ferricyanide, potassium ferricyanide, sodium ferrocyanide and potassium ferrocyanide and from about 1.0% to about 10.0% polyvinyl alcohol.

4. The process of claim 2 in which the catalyst is hydrogen peroxide.

5. The process of claim 4 in which the aliphatic mercaptan is tertiary octyl mercaptan.

6. The process of claim 5 in which the complex inorganic cyanide compound is potassium ferrocyanide.

7. The process of claim 2 in which the catalyst is a water-soluble persulfate compound.

8. The process of claim 7 in which the aliphatic mercaptan is tertiary octyl mercaptan.

9. The process of claim 8 in which the complex inorganic cyanide compound is potassium ferrocyanide.

10. The process of claim 3 in which the catalyst is hydrogen peroxide.

11. The process of claim 10 in which the complex inorganic cyanide compound is potassium ferrocyanide.

12. The process of claim 11 in which the sulfated isopropyl ester is sulfated isopropyl oleate.

13. The process of claim 3 in which the catalyst is a water-soluble persulfate compound.

14. The process of claim 13 in which the complex inorganic cyanide compound is potassium ferrocyanide.

15. The process of claim 14 in which the sulfated isopropyl ester is sulfated isopropyl oleate.

References Cited in the file of this patent

UNITED STATES PATENTS

| Number | Name | Date |
|---|---|---|
| 2,383,425 | Stewart | Aug. 21, 1945 |
| 2,397,201 | Pfau | Mar. 26, 1946 |
| 2,398,344 | Collins et al. | Apr. 16, 1946 |
| 2,434,054 | Roedel | Jan. 6, 1948 |
| 2,473,929 | Wilson | June 21, 1949 |
| 2,508,734 | Troyan | May 23, 1950 |

OTHER REFERENCES

Schwartz et al., Surface Active Agents, 1949, Interscience, 1949, pp. 51 and 52.